Nov. 9, 1965  G. W. SHERWOOD  3,217,224
FLASHLIGHT BATTERY CHARGING EQUIPMENT
Filed Dec. 3, 1962  3 Sheets-Sheet 1

INVENTOR.
GEORGE W. SHERWOOD
BY
ATTORNEYS.

Nov. 9, 1965    G. W. SHERWOOD    3,217,224
FLASHLIGHT BATTERY CHARGING EQUIPMENT
Filed Dec. 3, 1962    3 Sheets-Sheet 2

INVENTOR.
GEORGE W. SHERWOOD
BY Whittemore
Hulbert & Belknap
ATTORNEYS.

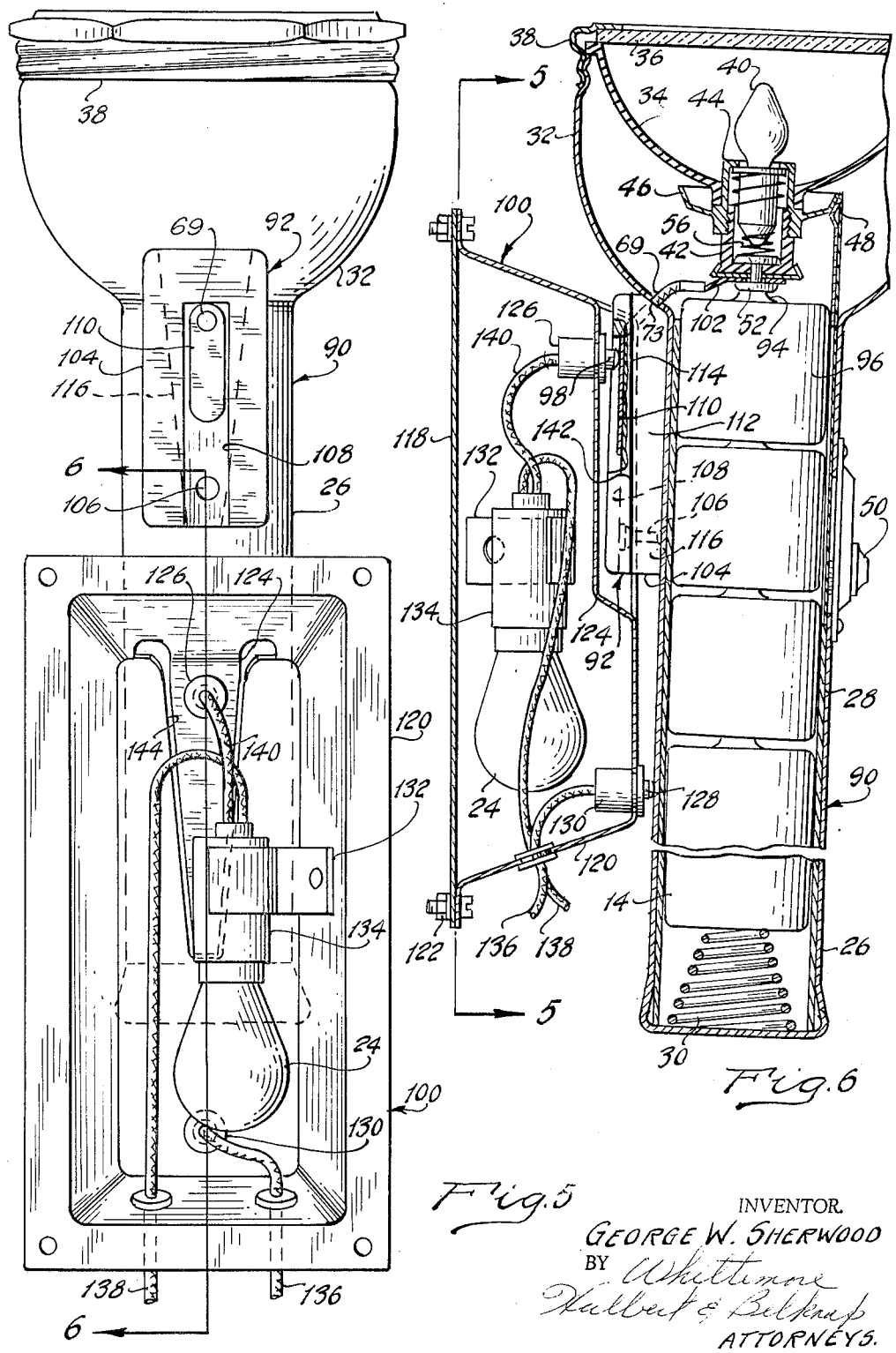

United States Patent Office 3,217,224
Patented Nov. 9, 1965

3,217,224
FLASHLIGHT BATTERY CHARGING EQUIPMENT
George W. Sherwood, 1347 Audubon, Grosse Pointe Park, Mich.
Filed Dec. 3, 1962, Ser. No. 241,651
7 Claims. (Cl. 320—2)

The invention relates to battery charging equipment and refers more specifically to a flashlight including chargeable batteries and apparatus for charging the batteries of the flashlight without removing the batteries from the flashlight and for supporting the flashlight.

In the past flashlights have generally been powered by batteries which were discharged during use and which on being discharged were either discarded and replaced by new fully charged batteries or were removed from the flashlight and recharged. Thus with prior flashlight constructions the batteries were permitted to discharge a great deal of their stored energy before being replaced or recharged. Therefore in the past the strength of the light provided by a flashlight has varied depending on the state of charge of the batteries thereof and the light has sometimes failed at extremely inopportune moments due to total discharging of the batteries.

Poor flashlight operation due to discharged batteries is especially undesirable if the flashlight is used a great deal, such as by watchmen in factories or the like or used in special circumstances on an automobile, boat or airplane. Failure of flashlights due to discharged batteries is intolerable when the flashlight is used in emergency situations such as by police or firemen.

Therefore it is one of the objects of the present invention to provide means for maintaining the batteries of a flashlight in maximum charged condition.

Another object is to provide a flashlight, a rechargeable battery flashlight power supply within the flashlight and separate apparatus for charging the battery power supply without removing the power supply from the flashlight.

Another object is to provide separate apparatus for charging the batteries of a flashlight without removing the batteries from the flashlight which is operable simultaneously to support the flashlight in a stored position.

Another object is to provide a flashlight for use with battery charging apparatus as set forth above wherein the flashlight outer case is constructed of conductive material and is connected to one terminal of batteries in series within the flashlight and wherein a conducting member is provided secured to the flashlight outer case and insulated therefrom connected in series with the other terminal of batteries within the flashlight.

Another object is to provide apparatus for charging the batteries of a flashlight as set forth above including a source of direct electric current, electrically conducting supporting brackets engageable with the flashlight case and the conducting member secured thereto, one of which is connected directly to one terminal of the source of direct current and the other of which is connected through a current limiting lamp to the other terminal of the source of electric current.

Another object is to provide apparatus for charging the batteries of a flashlight as set forth above including a source of direct electric current, a housing having an offset portion therein, a resiliently supported contact member within the offset portion adapted to make contact with the flashlight supported conducting member, another resiliently supported contact member secured to the housing in spaced relation to the offset portion and engageable with the flashlight case and means for connecting one terminal of the current source directly to one of the contact members and the other terminal of the current source to the other of the contact members through a current limiting lamp.

Another object is to provide apparatus as set forth above wherein a unidirectional current limiting device is provided between said other terminal of the current source and the lamp.

Another object is to provide a plurality of battery charging apparatus as set forth above secured to a single mounting board and connected to a single source of direct electric current for supporting a plurality of flashlights as set forth above in storage.

Another object is to provide a flashlight as set forth above wherein the connection between the conducting member and batteries is a pivotal connection.

Another object is to provide a flashlight and flashlight battery charging apparatus as set forth above which are simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 5 is a view of a modification of the flashlight and flashlight charging apparatus illustrated in FIGURE 1 taken substantially on the line 5—5 in FIGURE 6 with the flashlight removed from the flashlight charging apparatus.

FIGURE 6 is a section view of the flashlight and flashlight battery charging apparatus illustrated in FIGURE 5 taken substantially on the line 6—6 in FIGURE 5.

FIGURE 7 is a diagrammatic representation of a plurality of the flashlights and flashlight charging apparatus illustrated in FIGURES 5 and 6 secured to a single mounting board having in conjunction therewith means for providing a direct charging current for the flashlight batteries from a single source of alternating electrical potential.

Figure 1:
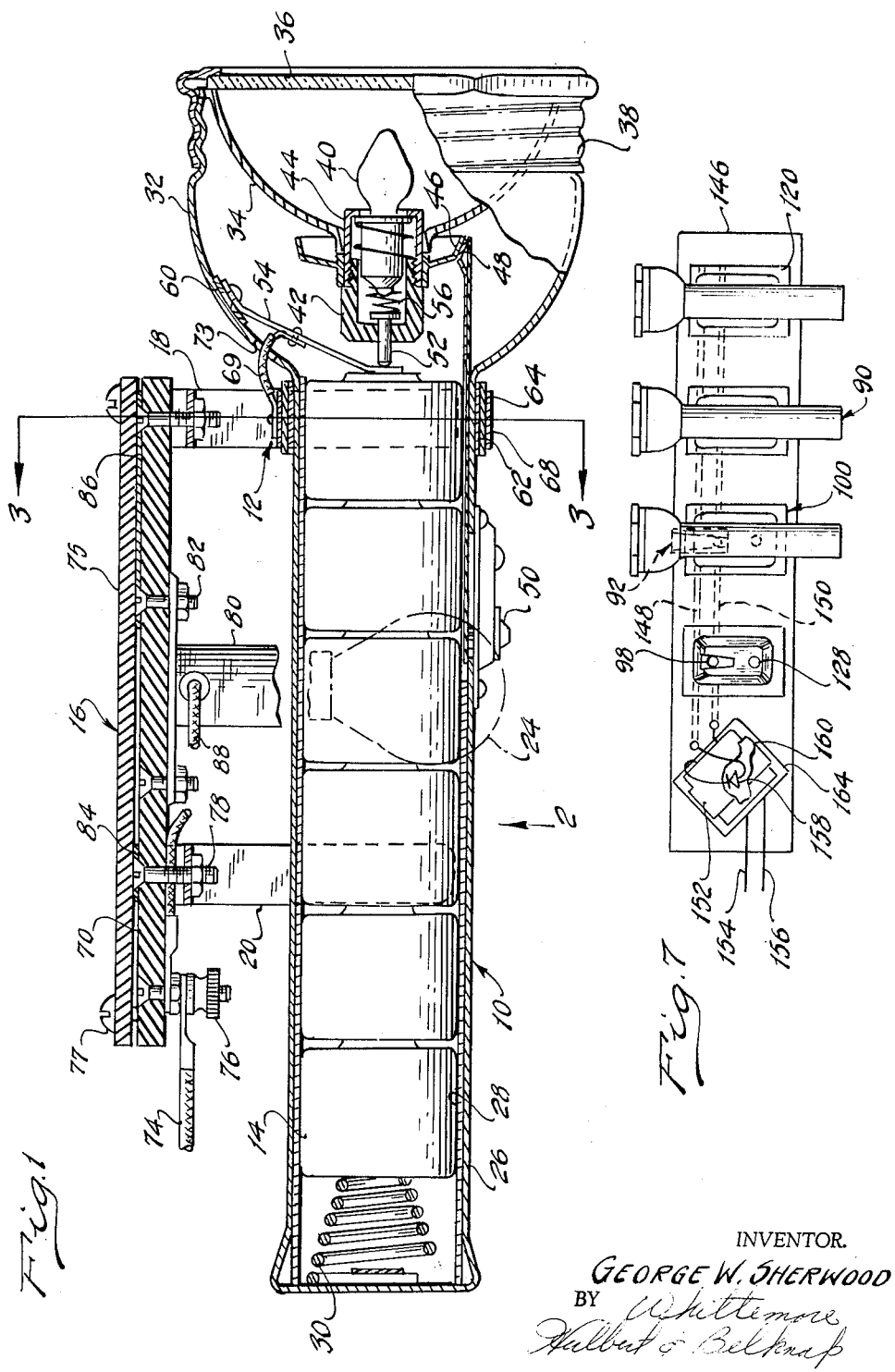
FIGURE 1 is a longitudinal section view of a flashlight and flashlight battery charging apparatus constructed in accordance with the invention and taken substantially on the line 1—1 in FIGURES 2 and 3.
Figure 2:
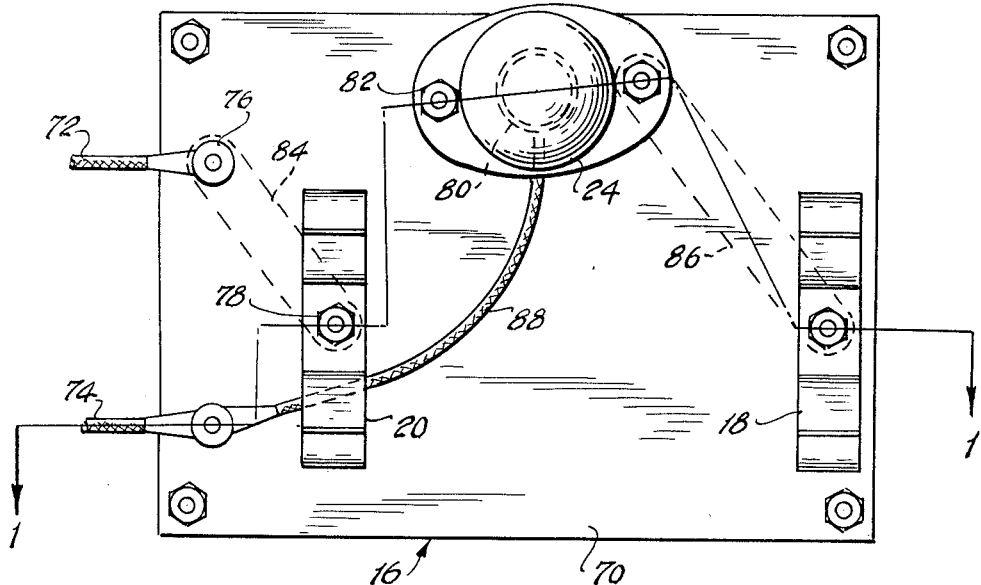
FIGURE 2 is a view of only the battery charging apparatus illustrated in FIGURE 1 taken in the direction of arrow 2 in FIGURE 1.

With particular reference to the figures of the drawings one embodiment of the present invention will now be considered in detail.

In accordance with the invention, as shown in FIGURES 1-4, the flashlight 10 is provided with structure 12 for completing an electric circuit through the chargeable flashlight batteries 14 from the flashlight battery charging apparatus 16 when the flashlight 10 is positioned in brackets 18 and 20 of the battery charging apparatus 16. Battery charging apparatus 16 includes structure for connecting the brackets 18 and 20 to a source of direct electric current 22 illustrated in FIGURE 4 through the current limiting lamp 24.

In operation a current sufficient to charge the flashlight batteries 14 but not harm them is passed through the batteries 14 on storing of the flashlight 10 in brackets 18 and 20. Batteries 14 are therefore likely to be at substantially full charge each time they are removed from a storage position thereof depending only on the required charging times of the batteries, and the frequency and length of use of the flashlight.

In installations of the charging apparatus 16, such as in automobile ignition circuits where reverse flow of current through the batteries 14 with the flashlight in brackets 18 and 20 is possible the diode, unidirectional current limiting device 23 may be provided to permit charging of the batteries 14 and prevent subsequent undesirable current drainage therefrom.

More specifically the flashlight 10 includes the cylindrical case 26 which is constructed of aluminum or similar material for conducting electricity. An insulating sleeve 28 is provided in the case 26 for insulating the chargeable batteries 14 positioned in the case 26 from the case 26. Contact is made between the end battery 14 at the left in FIGURE 1 and the case 26 by means of the conical spring 30 urging the batteries 14 to the right in FIGURE 1.

The flashlight case 26 is provided with a bell shaped end 32 to which the reflecting member 34 and lens 36 are secured by the cover member 38. Flashlight bulb 40 is secured between the electrically conducting cylindrical member 44 on which the reflecting member 34 is press fitted and spring 56 by the threaded engagement of the member 44 with the cylindrical member 42, as shown in FIGURE 1.

The electrically conducting member 46 also is press fitted on the member 44 and makes contact with the switch finger 48 of the switch 50. Switch 50 is operable to complete an electrical circuit through the batteries 14 in series, pin 52 resiliently engaged with the resilient electrically conducting member 54, spring 56, lamp 40, member 44, electrically conducting member 46, switch finger 48, the case 26 of the flashlight 10 and the conical spring 30 back to the batteries 14.

The flashlight as thus considered is modified by the inclusion of the resilient electrically conducting member 54 which is secured to the bell portion of the flashlight case and is insulated therefrom by convenient means 60 and the structure 12 for completing an electric circuit through the batteries 14 from the apparatus 16.

Figure 3:
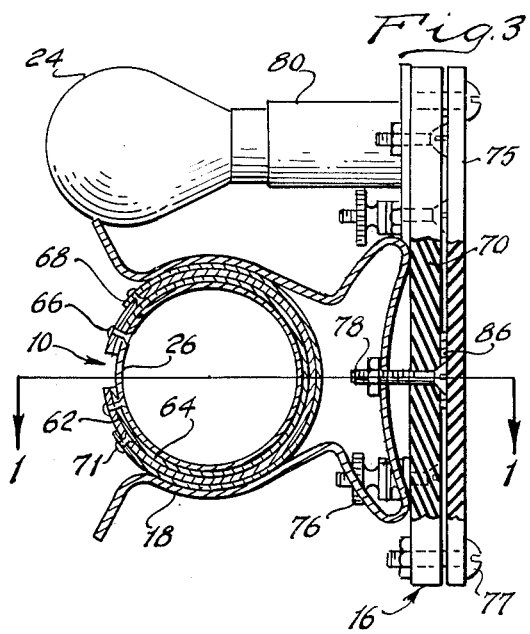
FIGURE 3 is a section view of the flashlight and flashlight battery charging apparatus illustrated in FIGURE 1 taken substantially on the line 3—3 in FIGURE 1.

The structure 12 includes a first insulating collar 62 secured around the flashlight case 26, a second insulating collar 64 secured to the case 26 of the flashlight along with the insulating collar 62 by convenient means, such as rivets 66, as shown best in FIGURE 3, and a collar of material for conducting electricity 68 secured to the collar 64 by convenient means, such as rivets 71, as illustrated in FIGURE 3, which is insulated from the case 26 by the insulating collar 62. The structure 12 further includes the electrical conductor 69 extending through the opening 73 in the bell shaped portion of the flashlight case 26 and connected to the resilient member 54, as shown best in FIGURE 1.

With the flashlight 10 so modified it will be seen that a direct current electric signal applied between the case 26 and the collar 68 of the right polarity will charge the rechargeable batteries 14. The polarity required with a particular flashlight will depend on the battery structure and orientation. With the usual structure wherein the central terminal of the batteries is positive and the case of the batteries is negative bracket 18 should be connected to the positive terminal of a source of direct electrical potential.

The apparatus 16 for charging batteries 14 comprises a base 70 to which the electrical conductors 72 and 74 are connected by means of the nut and screw structure 76. The brackets 18 and 20 are similarly secured to the base 70 by means of the nut and screw structures 78 while the lamp 24 is supported in a housing 80 connected to the base 70 by means of nut and screw structures 82. The straps 84 and 86 for conducting an electric signal are provided between the conductor 72 and bracket 20 and the lamp supporting housing 80 and the bracket 18 respectively, as shown best in FIGURE 2. A further electric connection is made between the central terminal (not shown) of lamp 24 and the electrical conductor 74 by the electrical conductor 88 extending therebetween. Cover member 75 is secured to base 70 by bolt and nut structure 77 to electrically insulate the straps 84 and 86.

Figure 4:
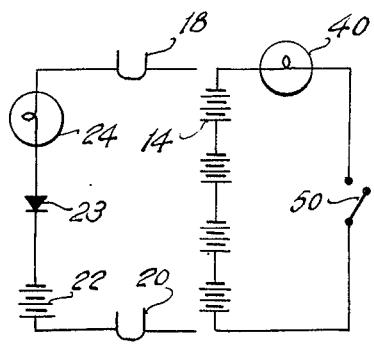
FIGURE 4 is an electrical schematic diagram of the flashlight and flashlight charging apparatus illustrated in FIGURE 1.

Thus the electric circuit of the battery charging apparatus 16 shown in FIGURE 1 is as illustrated schematically in conjunction with the schematic diagram of the flashlight 10 in FIGURE 4. The battery 22 represents a source of electrical energy to which the conductors 72 and 74 are connected. One end of the battery 22 is connected to the bracket 20 while the other end of the battery 22 is connected through lamp 24 to the bracket 18. On consideration of the schematic diagram of FIGURE 4 it will be seen that on placing the flashlight case in the bracket 20 with the bracket 18 in electrical contact with the collar 68, the battery 22 is placed in series with the chargeable batteries 14 and the lamp 24.

With the lamp 24 chosen to be of a proper size in accordance with the direct current power supply chosen, the current flow through the chargeable batteries 14 may be maintained at or below ten percent of the maximum rated capacity of the batteries 14 whereby continuous charging of the batteries 14 with the flashlight 10 supported by the battery charging apparatus 16 will have no adverse effect on the chargeable batteries 14 and will keep them in peak condition which will provide full charge of the batteries 14 and maximum light from the bulb 40 with use of the flashlight within the practical limits of the charging cycle of the batteries 14 with relation to the usage and storage time thereof.

Further due to the low current flow permitted through the batteries 14 by the lamp 24 and the consequent low current drain from the source 22 continued charging of batteries 14 from the usual equipment carried by automobiles, boats and aircraft is feasible. The current drain caused by apparatus 16 is negligible in such installations with the conductor 72 or 74 connected through the ignition switch for example.

Thus it will be seen that in accordance with the invention there is provided a particularly simple, economical and efficient flashlight including a chargeable battery power supply and charging apparatus therefor which is capable of maintaining a flashlight in peak operation condition with the flashlight in storage.

The modification of the invention illustrated in FIGURES 5, 6 and 7 comprises battery charging apparatus 100 and a flashlight 90 similar to the flashlight 10 illustrated in FIGURES 1–4 with the exception that the resilient member 54 has been eliminated from the flashlight 90 and a structure 92 has been provided on the flashlight 90 for the connection of the central terminal 94 of the end chargeable battery 96 to the electric contact 98 carried by the flashlight battery charging apparatus 100. Where the same elements have been used in the modification of the invention illustrated in FIGURES 5, 6 and 7 they will be given the same reference numerals as used in conjunction with the flashlight 10 and battery charging apparatus 16 illustrated in FIGURES 1–4.

Since the flexible member 54 has been eliminated in the flashlight 90 the electrical conductor 69 is secured directly to the modified pin 52 in the flashlight 90 by means of the eyelet 102 secured to the conductor 69. Due to the provision of the eyelet 102 which is secured on the modified pin 52 for rotation with respect thereto the conductor 69 will not tend to break due to rotation of member 42 and pin 52. During removing of the cover 28 which action tends to rotate the reflecting member 34 and the member 42 secured thereto the eyelet 102 will rotate with respect to the modified pin 52 to relieve strain on the conductor 69.

The structure 92 includes a bracket of insulating material 104 secured to the case 26 of the flashlight 90 by convenient means, such as rivet 106. The bracket 104 is provided with a centrally located groove 108 therein in which the contact member 110 is located. The conductor 72 is electrically secured to contact member 110.

Bracket 104 is additionally provided with identical recesses 112 on opposite sides thereof which include a surface 114 tapered away from the surface of the case 26 toward the bell shaped portion 32 thereof, as shown best in FIGURE 6. The recesses 112 further each include a surface 116 perpendicular to surface 114 and converging away from the bell shaped portion 32 of the case 26. The action of the bracket 104 and contact member 110 will be considered in more detail in conjunction with the cooperation between the battery charging apparatus 100 and the flashlight 90.

The battery charging apparatus 100 comprises a closure plate 118 to which the housing 120 is secured by convenient means, such as the bolt and nut structures 122. Housing 120 is provided with a wedge shape offset portion 124 therein, as shown best in FIGURES 5 and 6, to which contact member 98 is secured by means of the resilient mounting 126. A second contact member 128 is secured to the housing 120 by a similar resilient mounting 130.

The lamp 24 is secured within the housing 120 by convenient means, such as bracket 132, in which lamp housing 134 is positioned. As before the electrical conductor 136 is connected directly to the contact member 128 while the conductor 138 is connected to the contact member 98 through the lamp 24 by means of the conductor 140.

In operation the conductors 136 and 138 are connected to a source of direct current with the proper polarity as previously considered. The flashlight 90 is then placed in a position, as shown in FIGURE 5, wherein the bracket 104 is positioned to align the recesses 112 thereof on opposite sides of the offset portion 124 of the housing 120 of the battery charging apparatus 100 and the flashlight is moved into the position illustrated in FIGURE 6 wherein the surfaces 114 of the recesses 112 are in engagement with the surfaces 142 of the housing 120 on opposite sides of the offset portion 124 thereof.

During such movement the surfaces 116 of the recesses 112 are engaged with the surfaces 144 of the housing 120 to align the flashlight 90 with the housing 120, as shown best in FIGURES 5 and 7. Also during the movement of the flashlight 90 from the position illustrated in FIGURE 5 to that illustrated in FIGURE 6 the tapered surface 114 of the recesses 112 engaged with the surfaces 142 of the housing 120 tend to pivot the flashlight 90 so that good electrical contact is made between the flashlight case 26 and the electrical contact 128 resiliently mounted in the housing 120. In addition contact member 110 is engaged with the resiliently mounted electric contact 98 with the flashlight 90 in position on the housing 120, as illustrated in FIGURE 6. A complete series charging circuit similar to that illustrated in FIGURE 4 is thus provided through the batteries 96, electrical contact 98, lamp 24, a source of direct current (not shown) to be connected to conductors 136 and 138, electrical contact 128, case 26 and spring 30.

As illustrated best in FIGURE 7 a plurality of the apparatus 100 for charging flashlight batteries 96 in flashlights 90 minus closure plates 118 may be secured to a single mounting board 146 by securing the housing 120 to the board 146 by means of the bolt and nut structure 122. The conductors 136 and 138 of the separate apparatus 100 may then be connected to bus bars 148 and 150 secured to the back of the board 146, as shown in FIGURE 7, by convenient means (not shown). If desired the bus bars 148 may then be connected to the rectified output of an alternating potential transformer 152 supplied with an alternating potential over the conductors 154 and 156 from a source (not shown). The output of the transformer 152 is illustrated as rectified by a rectifier 158 mounted on a heat sink 160 located beneath the perforated cover 164 for the transformer 152. The current supplied to the individual battery charging apparatus 100 is thus again direct current.

While one embodiment and a modification of the present invention have been considered in detail, it will be understood that other embodiments and modifications of the invention are contemplated. For example, a rectified alternating current signal may be used in conjunction with the apparatus 16 as it is with apparatus 100. Also an extra light and charging circuit may be added to either apparatus 16 or 100 on, for example, boats to charge the boat batteries when the battery charging source is external of the boat, such as an alternating current dock source. It is therefore the intention to include all embodiments and modifications of the invention as are encompassed by the appended claims within the scope of the invention.

What I claim as my invention is:

1. A flashlight, a wedge shaped insulating bracket secured to said flashlight, a pair of exposed electric flashlight terminals one of which is supported by the flashlight and one of which is supported by the wedge shaped bracket, chargeable batteries carried by and positioned within the flashlight in series with said terminals for providing a power supply for the flashlight and apparatus for supporting the flashlight and for charging the flashlight batteries while the batteries remain in the flashlight including a housing having end, side and top surfaces, a wedge shaped offset portion forming a recess in said housing, a source of direct electric current, a pair of electric contact members, means for resiliently supporting the electric contact members comprising resilient members secured to the housing one of which is positioned within the recess in the housing and conductor means connecting the electric contact members to the source of direct current, said wedge shaped bracket secured to said flashlight being adapted to fit within said recess to maintain the electric contact members on the supporting apparatus in engagement with the flashlight terminals.

2. Structure as set forth in claim 1 wherein the insulating bracket on the flashlight is provided with a flange in spaced relation to the flashlight which has a surface adjacent the flashlight sloping toward the flashlight.

3. A flashlight, a wedge shaped insulating bracket secured to said flashlight, a pair of exposed electric flashlight terminals one of which is supported by the flashlight and one of which is supported by the wedge shaped bracket, chargeable batteries carried by and positioned within the flashlight in series with said terminals for providing a power supply for the flashlight and apparatus for supporting the flashlight and for charging the flashlight batteries while the batteries remain in the flashlight including a housing having a wedge shaped offset portion forming a recess therein, a source of direct electric current, a pair of electric contact members secured to the housing one of which is positioned within the recess in the housing and conductor means connecting the electric contact members to the source of direct current, said wedge shaped bracket secured to said flashlight being adapted to fit within said recess to maintain the electric contact members on the supporting apparatus in engagement with the flashlight terminals.

4. Flashlight structure comprising an electrically conductive outer case, a plurality of chargeable flashlight batteries positioned in series within said case, means operable between the case and one terminal of the batteries for connecting the case in series with the one terminal of the batteries, an electric lamp positioned adjacent and in electrical engagement with the other terminal of the batteries in series therewith, switch means in series between the lamp and outer case for completing a series circuit through the batteries and lamp, an insulating bracket extending longitudinally of the flashlight and provided with longitudinally extending converging sides secured to the exterior of the outer case, a contact member secured to the insulating bracket and means connecting the contact member to the other terminal of the batteries.

5. Structure as set forth in claim 4 wherein the insulating bracket is provided with a surface adjacent the flashlight sloping toward the said case at the end of the bracket toward which the sides converge.

6. Flashlight structure comprising an electrically conductive outer case, a plurality of chargeable flashlight batteries positioned in series within said case, means operable between the case and one terminal of the batteries for connecting the case in series with the one terminal of the batteries, an electric lamp positioned adjacent and in electrical engagement with the other terminal of the batteries in series therewith, switch means in series between the lamp and outer case for completing a series circuit through the batteries and lamp, an insulating bracket secured to the exterior of the outer case, a contact member secured thereto and means connecting the contact member to the other terminal of the batteries comprising an electrical conductor having an eyelet secured thereto, a headed pin over which the eyelet is sleeved for pivotal movement with respect thereto positioned between and electrically engaged with the other terminal of the batteries and the lamp in series therewith.

7. Battery supporting and charging apparatus comprising a housing including end, side and top surfaces, an inwardly offset portion forming a recess in one end and said top surface thereof, said top surface having a general wedge shape and including sides extending outwardly over said recess converging toward each other, a pair of electric contact members, means resiliently mounting said contact members on said housing with one of said contact members positioned within said recess, a source of direct electric current, current limiting means, means for connecting one of the contact members directly to one terminal of the source of electric current and means for connecting the other contact member to the other terminal of the source of electric current in series through the current limiting means.

References Cited by the Examiner
UNITED STATES PATENTS

| | | | |
|---|---|---|---|
| 1,950,428 | 3/34 | Young | 320—6 |
| 1,981,210 | 11/34 | Wheat | 320—2 |
| 1,999,079 | 4/35 | Blake | 320—2 |
| 2,236,338 | 3/41 | Emanuel | 320—2 |
| 2,982,849 | 5/61 | Volkering | 320—2 X |

OTHER REFERENCES

Harvey: "Battery Chargers and Charging," London (1953), p. 68.

MILTON O. HIRSHFIELD, *Primary Examiner.*
LLOYD McCOLLUM, *Examiner.*